United States Patent [19]
Sullivan et al.

[11] Patent Number: 5,528,122
[45] Date of Patent: Jun. 18, 1996

[54] BATTERY VOLTAGE EQUALIZER CIRCUIT

[75] Inventors: James D. Sullivan, Galena; John A. Melvin, Westerville, both of Ohio

[73] Assignee: Véntron Corporation, Galena, Ohio

[21] Appl. No.: 346,462

[22] Filed: Nov. 29, 1994

[51] Int. Cl.[6] .......................... H01M 10/44; H01M 10/46
[52] U.S. Cl. ................................... 320/6; 320/17
[58] Field of Search .............................. 320/6, 7, 15, 16, 320/17, 65, 67, 49, 30; 363/17, 19, 21, 63

[56] References Cited

U.S. PATENT DOCUMENTS

| | | | |
|---|---|---|---|
| 4,479,083 | 10/1984 | Sullivan | 320/6 |
| 4,502,000 | 2/1985 | Mashikian | 320/6 |
| 4,502,001 | 2/1985 | Galloway | 320/6 |
| 4,949,028 | 8/1990 | Brunz | 320/6 |
| 4,967,136 | 10/1990 | Nofzinger | 320/6 |

Primary Examiner—Peter S. Wong
Assistant Examiner—Edward Tso
Attorney, Agent, or Firm—Frank H. Foster; Kremblas, Foster, Millard & Pollick

[57] ABSTRACT

A battery equalizer for equalizing the voltage on series connected batteries synchronously switches the opposite ends of a tapped autotransformer in alternately reversing connection to the distally opposite terminals of the battery by alternately turning transistor switches on and off in alternate pairs while maintaining a center tap of the autotransformer connected to an intermediate terminal of the series batteries. Switching is accomplished by power field effect transistors and a voltage converter converts the upper battery voltage to a floating voltage so that the voltages of the two batteries can be differenced. The differenced voltage provides an error signal for driving a pulse width modulator which switches the transistors. Two protective power switching field effect transistors are interposed in the circuit and connected to prevent damage to the circuitry in the event of misconnection.

20 Claims, 6 Drawing Sheets

BATTERY VOLTAGE EQUALIZER CIRCUIT

TECHNICAL FIELD

This invention relates generally to battery power supply systems, such as used in vehicles, and more particularly relates to an electronic circuit for equalizing the voltage on two or more series connected storage batteries.

BACKGROUND ART

Many vehicles, such as buses and ambulances, are provided with on board electrical systems including one or more batteries for supplying electrical power to a variety of loads such as lights, specialized equipment, and vehicle accessories. Some of these loads are motors, such as a starting motor for a large diesel engine, or for driving air conditioners, which must provide a high torque and therefore have a high power requirement. It is desirable to supply such high power loads at a voltage greater than 12 volts, such as 24 volts, in order to meet the high torque requirements without excessive current and consequent resistive losses. However, storage batteries for vehicles are conventionally produced with a standard 12 volt nominal battery voltage. Furthermore, lights, fare boxes, radios, transmissions and many accessories and other equipment for use on vehicles are conventionally manufactured for use with a nominal 12 volt system.

Therefore, it is desirable to take advantage of the cost savings of using conventionally available 12 volts electrical equipment and 12 volt batteries on a vehicle while also providing a DC supply voltage and supplying greater than 12 volts to the larger loads, such as motors. This has traditionally been accomplished by utilizing two or more 12 volt batteries connected in series. The high power requirements can then be delivered at the sum voltage of the series batteries and yet power can be supplied to the 12 volt loads at the voltage of the 12 volt batteries. In this manner, the 12 volt loads can be supplied by connecting them in parallel to one of the 12 volt batteries, typically the battery which is connected to vehicle ground, and the higher voltage loads can be connected parallel to the entire set of series batteries.

Unfortunately, however, in the absence of additional circuitry, such connection causes the battery which is parallel to the 12 volt loads to become undercharged, drained, and reduced in voltage while the other battery or batteries becomes overcharged and raised to an excessive voltage. This occurs because the alternator is connected parallel to the set of series batteries and consequently all charging current used to charge the battery supplying the 12 volt loads must also flow through the other 12 volt battery or batteries. Therefore, a series battery which does not supply the 12 volt loads becomes overcharged and, as a result, the grounded battery which supplies the 12 volt loads cannot be maintained in a charged condition at full voltage.

In order to correct this problem a battery equalizer was developed and is shown in U.S. Pat. No. 4,479,083. The battery equalizer of that patent is a three terminal device which is connected to the three terminals of two series connected batteries. It causes two series connected batteries of equal voltage to contribute equally to the current supplied to the 12 volt loads as if the two batteries were connected in parallel. The battery equalizer extends battery life by maintaining the voltages of the two batteries equal because the equalizer holds the voltage, at the intermediate terminal between the two batteries, at a voltage which is equal to one-half the sum of the two battery voltages. Therefore, neither battery becomes significantly overcharged or undercharged. The equalizer of that patent, like the equalizer of the present invention may also be applied to more than two series connected batteries by applying the principles explained in the above cited patent and in this patent specification to provide a four or more terminal device.

Although the equalizer of the above cited patent was a substantial improvement, some problems remain and are discussed more fully in the following Detailed Description. For example, it was recognized that disconnection of either the grounded battery terminal or the 24 volt battery terminal can damage the battery equalizer circuit. Therefore, protective components were inserted to protect the equalizer circuit from those fault conditions. However, those protective components consume significant energy and therefore reduced the overall efficiency of the equalizer circuit. It is therefore an object and feature of the present invention to provide an equalizer circuit which will not be damaged from disconnection of the ground terminal of the grounded battery or the 24 volt terminal of the other battery and yet is protected by circuit elements which consume less energy so that the equalizer can have a higher efficiency.

Additionally, since a three terminal equalizer is used for two series connected batteries, there are several possible misconnections of the device which can occur as a result of human error. If the device of the prior art is misconnected it can be damaged by resulting electrical currents. Therefore, it is another object and feature of the present invention to provide a circuit which can be misconnected and yet will not be damaged, In the equalizer circuit of the above prior art patent, voltage dividing resistors were used to develop a voltage which represented the average of the sum of the two battery voltages to provide a reference voltage. That reference voltage was differenced with the output voltage of the battery supplying the 12 volt loads and that difference voltage provided an error signal. The error signal was applied to a switching control circuit having a pulse width modulator to control the width of a rectangular wave applied to switch the two switching transistors of that circuit.

The problem with that system for detecting an error signal is that the circuit requires precision resistors which not only needlessly consume energy, but more importantly any variation in the resistance of those precision resistors, as a result of aging, causes corresponding errors in the developing error signal and a consequent error in the equalization of the battery voltages.

There is therefore a need for a more accurate and more stable circuit and method for detecting any equalization errors and therefore for maintaining more accurate equalization of the batteries.

Additionally, there is a need for a battery voltage equalizer which is bidirectional, that is which has the capability of transferring energy from whichever battery is at the greater voltage to the other battery at the lower voltage. Additionally, it is advantageous to provide an equalizer which requires no circuit breaker or fuse.

BRIEF DISCLOSURE OF INVENTION

In the present invention, the opposite ends of a tapped autotransformer are synchronously switched in alternately reversing connection to the distally opposite terminals of the series batteries by alternately turning transistor switches on and off in alternate pairs. A tap of the autotransformer is connected to an intermediate terminal of the series batteries.

The invention further contemplates detecting the voltages on the two series batteries and subtracting one voltage from the other and then switching the transistors on for an interval of time which is proportional to the different in battery voltage over a range of voltage differences which includes a substantially zero voltage difference. For this purpose, the voltage between the intermediate battery terminal and the ungrounded distal terminal of the series batteries is converted to a floating voltage which can be series connected to the grounded battery to get a voltage difference referenced to ground.

The circuit of the present invention utilizes a full bridge arrangement, having a first pair of opposite bridge nodes for connection to the distally opposite battery terminals of the series batteries. The bridge has four legs which define a second pair of opposite, intermediate bridge nodes. Each leg of the full bridge includes a power switching transistor. The autotransformer has its opposite end terminals connected between the second pair of bridge nodes and has its center tap connected to the intermediate terminal of the series batteries. A switching control circuit is connected for switching each of the transistors and is adapted to synchronously and alternatingly turn on the switching transistors of obliquely opposite legs of the bridge for connecting the opposite end terminals of the autotransformer to the distally opposite battery terminals in alternating polarities.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art. In addition, circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION

Figure 1:
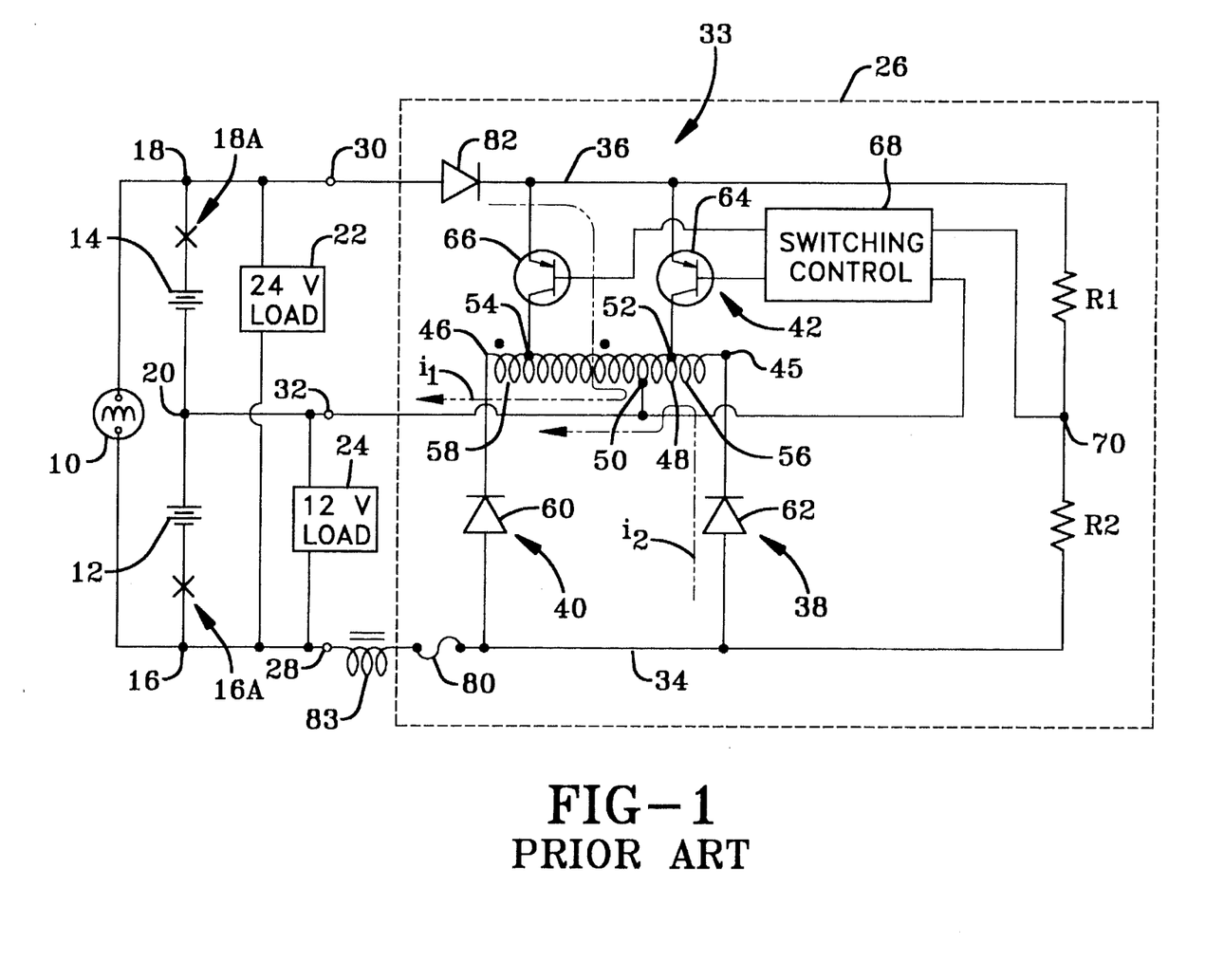
FIG. 1 is a schematic diagram of a prior art circuit.

FIG. 1 illustrates a prior art circuit. The circuit of FIG. 1 has an alternator 10 for charging both a lower grounded storage battery 12 and an upper storage battery 14 which are connected in series. The batteries have distally opposite battery terminals 16 and 18 and an intermediate battery terminal 20. The series connected batteries 12 and 14 have their distally opposite battery terminals 16 and 18 connected to supply power to the 24 volt loads 22. The 12 volt loads 24 are connected parallel to the grounded battery 12 at the distal grounded battery terminal 16 and the intermediate battery terminal 20.

The equalizer circuit 26 has a pair of distally opposite equalizer terminals 28 and 30 and an intermediate equalizer terminal 32, which are connected to corresponding battery terminals. The equalizer uses a full bridge circuit, also known as an H-bridge or a Wheatstone bridge 33. The full bridge 33 has a first pair of opposite nodes 34 and 36 which are connected to the distally opposite equalizer terminals 28 and 30. The full bridge 33 also has four legs 38, 40, 42, and 44 which form the bridge and between these legs defines a second pair of opposite, intermediate bridge nodes 45 and 46. The four element bridge is a well known circuit, sometimes depicted in a diamond shape. When illustrated in a diamond shape, the bridge conventionally has a first pair of bridge nodes at the top and bottom of the diamond and a second pair of bridge nodes at the left and right side. These nodes are interconnected by circuit elements. Since the circuit is electrically identical whether depicted in an H or diamond format, reference to those nodes is made in this description.

An autotransformer 48 has its opposite end terminals connected between the second pair of bridge nodes 45 and 46. The autotransformer 48 also has a center tap 50 connected to the intermediate equalizer terminal 32. As would be apparent to those skilled in the art, and as described in the above cited prior art patent, the autotransformer also has additional taps 52 and 54 at its opposite ends to form bias windings 56 and 58. The bias windings provide voltage offset compensation for circuit voltage drops under higher current conditions and are necessary in the prior art circuit.

A pair of diodes 60 and 62 are interposed in the two lower legs of the full bridge 33 and a pair of bipolar, power switching transistors 64 and 66 are interposed in the upper two legs to form a push-pull converter. A pair of precision resistors R1 and R2 are also series connected in shunt across the first pair of opposite bridge nodes 34 and 36. A switching control circuit 68 has a pair of inputs, one connected to the intermediate node 70 between resistors R1 and R2 and the other connected to the center tap 50 of the autotransformer 48. The voltage at the intermediate node 70 referenced to ground is the average of the sum of the battery voltages if, as desired for two batteries, the resistance of those resistors is exactly equal. The outputs of the switching control circuit 68 is connected to the switching control input terminals of the switching transistors 64 and 66 for switching the transistors 64 and 66 between on and off states.

In the operation of the prior art circuit of FIG. 1, the switching control circuit 68 detects the difference between the reference voltage at the intermediate node 70 and the voltage at the center tap 50. This difference voltage provides an error signal which pulse width modulates the switching control current applied to the switching transistors 64 and 66. Preferably, when the error voltage is substantially zero, pulses of substantially zero pulse width are applied to the switching transistors 64 and 66. For greater errors, the pulse width is increased in proportion to the error until each switching transistor 64 and 66 is switched on for alternate 50% duty cycles. In this manner, the opposite ends of the autotransformer 48 are alternately connected to the 24 volt equalizer terminal 30 in an alternately reversing manner.

During each half cycle of this alternating operation, one-half of the autotransformer is shunted across the upper battery 14, while the other half if shunted across the lower grounded battery 12. The connection of the halves of the autotransformer are reversed each half cycle. The upper battery drives a current through the autotransformer half which is connected to it, and that current induces a voltage in the other half of the autotransformer connected across the lower battery 12. In this manner, the voltage of the upper battery is reflected through the autotransformer so that it is applied at the equalizer terminals 28 and 32 to the 12 volt load 24 in parallel with the lower battery 12. As a result, power is delivered to the 12 volt loads 24 from both batteries. FIG. 1 illustrates currents I1 and I2 during the half cycle in which transistor 66 is switched on. During the other half cycle during which transistor 64 is switched on, similar currents flow through transistor 64 and diode 60.

However, in this prior art circuit, these currents can only flow and the above connections are only made when the upper battery voltage exceeds the lower battery voltage. The prior art circuit can only operate in a unidirectional manner because the diodes 38 and 40 and the bipolar transistors 64 and 66 can only conduct in one direction. If the lower battery voltage exceeds the upper battery voltage, the diode legs are essentially open circuited so they do not connect the ends of the autotransformer to the second node 34 of the first pair of bridge nodes.

Figure 2:
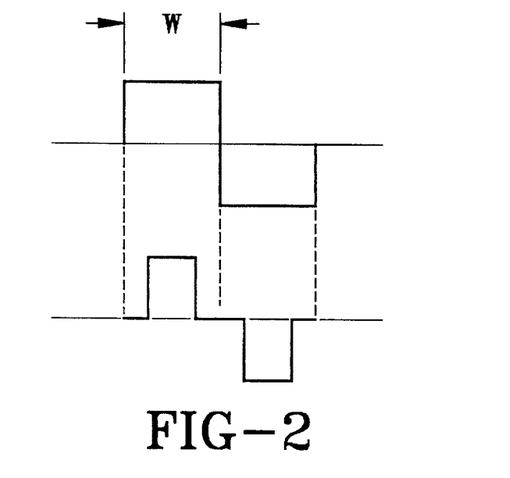
FIG. 2 is an oscillogram illustrating the pulse width modulation used for synchronously switching.

FIG. 2 is an oscillogram illustrating the pulse width modulated control currents applied to the transistors 64 and 66. The pulse width W is varied in proportion to the error voltage over a range of error voltages, including zero. Thus, from zero to some finite value, the pulse width is an increasing function of the error voltage and for error signals above that selected finite level, the pulse width is a 50% duty cycle for each switching transistor.

In the event that the circuit is opened, such as an open circuit resulting from the disconnection from ground of battery terminal 16 to provide an open circuit 16A, a runaway condition will result with increased voltages induced across the resistors R1 and R2 leading to destruction of the semiconductor devices. Consequently, a fuse 80 is inserted in the circuit.

Similarly, if the upper battery terminal 18 is disconnected from the circuit to provide an open circuit 18A, the lower grounded battery 12 applies a reverse bias to the circuit by a current transmitted through the 24 volt load 22, which can destroy the circuit elements. Consequently, a protective diode 82 is inserted to prevent such reverse current.

The protective diode 82, as well as the diodes 60 and 62 and the bipolar switching transistors 42 and 44, all consume substantial energy when in their conducting state because of their inherent, internal resistance.

An inductor 83 is also interposed in the grounded side of the equalizer circuit to operate as an AC ripple filter. It is desirable because modulation at less than 50% duty cycles introduces AC ripple which is smoothed by the ripple filter inductor 83.

Figure 3:
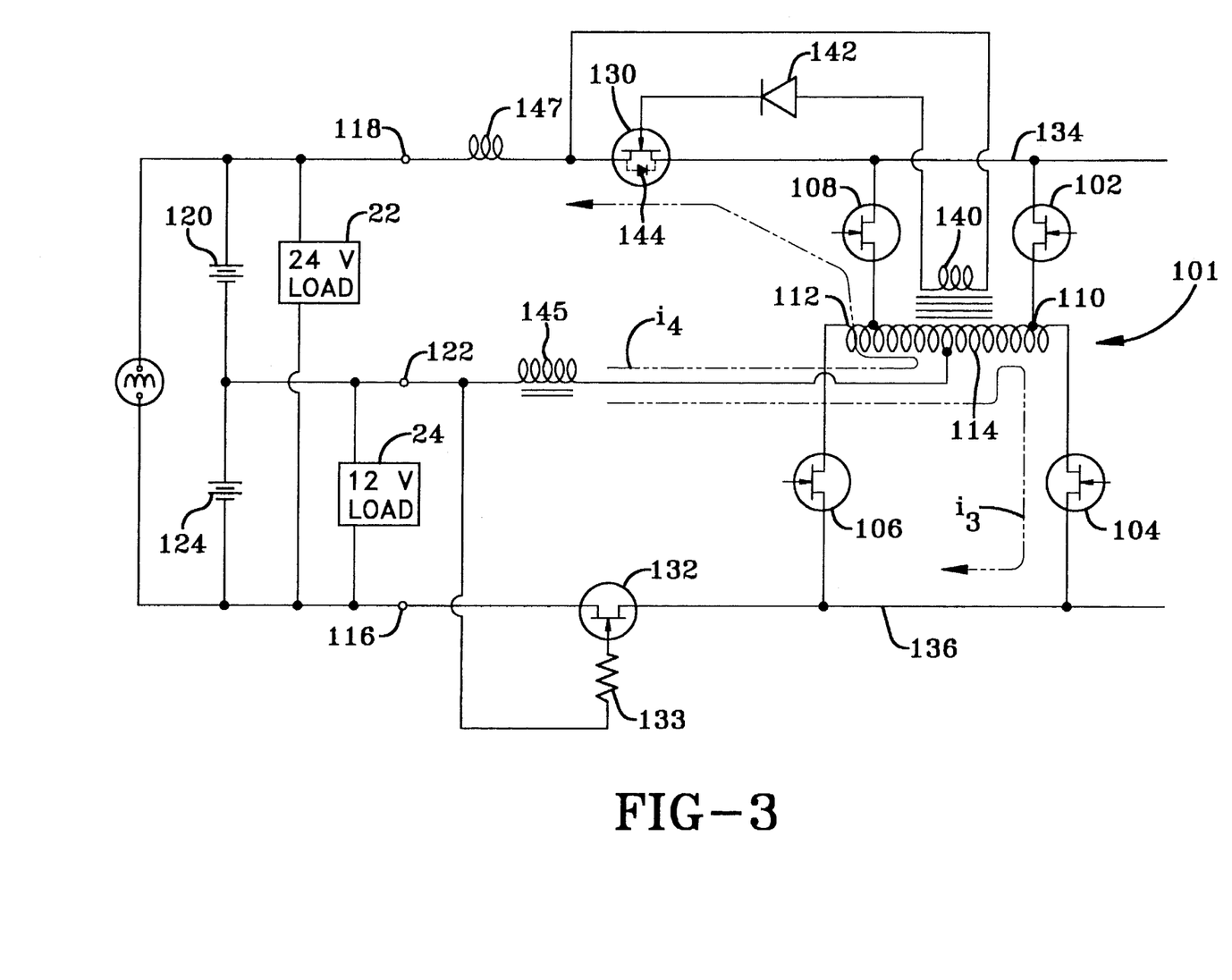
FIG. 3 is a schematic diagram of the preferred embodiment which is simplified for illustrating the principles of the present invention.

FIG. 3 illustrates some aspects of the present invention. Referring to FIG. 3, each of the four legs of the full bridge 101 have a power switching field effect transistor 102, 104, 106, and 108 interposed in each leg. Each power transistor has a gate forming its switching control terminal and these control terminals of each switching transistor are connected to a switching control circuit described below. The switching control circuit synchronously and alternatingly turns on the switching transistors of obliquely opposite legs of the bridge to connect the opposite end terminals 110 and 112 of the autotransformer 114 to the distally opposite equalizer terminals 116 and 118 in alternating polarities to provide alternating connection of the autotransformer 114 to the distally opposite equalizer terminals 116 and 118 in a manner similar to that provided by the prior art circuit of FIG. 1.

The preferred embodiment has bias windings 111 and 113 like the prior art. However, they are smaller as discussed below.

These bias windings, though preferred, are not necessary and the circuit will operate without them. Furthermore, they do not alter the operating principles of the circuit. Consequently, the end terminals 110 and 112 of the autotransformer are considered essentially identical on both sides of the small bias windings because the bias windings cause only a slight, though preferred, variation from operation without the bias windings and do not change the principles of operation.

One major advantage of using the FET power switching transistors is that they consume substantially less power when switched on because of their substantially lower internal resistance when switched to an one state. An additional advantage is that the FET transistors when switched to an on state can conduct current in either direction. The result of using such FET transistors in this circuit is that the equalizer circuit both becomes bidirectional and dissipates less energy. This bidirectional characteristic can be seen by first recalling that, as in the prior art circuit of FIG. 1, the battery voltage of the upper battery 120 is reflected through the autotransformer 114 into shunt connection across the 12 volt loads between the grounded distal equalizer terminal 116 and the intermediate equalizer terminal 122. This was illustrated in connection with currents I1 and I2 in FIG. 1, and similar currents during the other half cycle through transistor 64 and diode 60. However, using the FET transistors 102–108 also permits the voltage of the lower grounded battery 124 to be reflected into apparent parallel connection across the upper battery 120. This may be seen, for example, by considering the half cycle during which transistors 104 and 108 are turned on and transistors 102 and 106 are turned off. In that state, a current I3 flows through one-half of the autotransformer 114 to induce a voltage on the other half of the autotransformer 114 which is applied in shunt across the upper battery 120. When the transistor switching states are switched so that transistors 102 and 106 are turned on, similar currents flow to accomplish the same result.

The currents illustrating the reflection of the upper battery into apparent shunt with the lower battery and the currents illustrating the reflection of the lower battery into apparent shunt with the upper battery may then be considered under the theory of superposition. More specifically, it can be seen that the currents resulting from the reflection of the upper battery into apparent parallel relation with the lower battery, and the current representing the reflection of the lower battery into apparent parallel relation with the upper battery, are opposite in direction. Superposition indicates that the circuit operates in accordance with the sum of these two currents. Consequently, the net result is that the actual current through the circuit will be the difference between these two superimposed currents. The net effect will be that whichever battery has the greater voltage will reflect the greater voltage through the autotransformer and will therefore supply current to the 12 volt loads and a charging current to the battery having the lower voltage. In summary, the voltage of each battery is reflected from the half of the autotransformer which is connected in shunt with a battery over to the other half of the autotransformer and superimposed parallel to the other battery. With the DC voltage of the two batteries connected in parallel, the parallel battery voltage which is greater will supply current to both the load and the other battery.

In order to protect the circuit against miswiring, a first field effect transistor 130 is interposed between the first distal equalizer terminal 118 and a first node 134 of the H-bridge, and a second field effect transistor 132 is interposed between the second distal equalizer terminal 116 and the second node 136 of the full bridge. The first protective field effect transistor 130 has its gate connected to a secondary winding 140 formed on the autotransformer 114 through a rectifier 142 for turning on the first protective field effect transistor 130. The field effect transistor 130 contains a diode illustrated as diode 144, which is inherent in all field effect transistors. This inherent diode 144 permits sufficient current to flow through the FET 130 to allow the equalizer to begin operating when the circuit is properly connected. Only when sufficient current flows and operation begins can the secondary winding 140 turn on the FET 130. If the equalizer terminal 118 is erroneously connected to a negative terminal, the FET 130 cannot be turned on. However, when the circuit is properly connected, the FET 130 is turned on and provides substantially less power dissipation loss than the diode of the prior art, thus improving the efficiency of the equalizer circuit.

In the event of a disconnection of the equalizer, the circuit ceases operation which halts the bias on the gate of FET 130 which held FET 130 in its on state. FET 130 therefore switches off to initiate its protective mode and prevent damaging current flow through the equalizer circuit.

Although not preferred, other types of switching devices, such as a relay, could be used as an alternative to the FET 130 to obtain equivalent operation. The circuit uses a switch which is controlled by a voltage derived from proper operation of the circuit and a parallel diode which allows the circuit to begin to come on under transient conditions when the circuit is properly connected. For example, a relay can be connected parallel to a diode, such as diode 82 in FIG. 1, and have its actuation coil connected to the secondary winding 140 so that it is turned on when the circuit begins operating. The closure of the relay provides a low resistance parallel current path to substantially reduce the dissipation in the diode 82 in the prior art circuit.

Similarly, the protective FET 132, which is connected to the grounded distal equalizer terminal 116, has its gate connected to intermediate equalizer terminal 122 through a resistor 133 so that it can be turned on only when the unit is properly connected. In particular, the FET 132 is biased on by proper connection of the equalizer to the battery 124. In the event that the lower battery 124 is disconnected, the gate of FET 132 becomes reverse biased by upper battery 124 or has no bias and therefore FET 132 is switched off to initiate its protective mode by preventing current flow to the equalizer circuit. Alternatively, the gate resistor 133 could instead be connected to the 24 volt distal equalizer terminal 118 to obtain a similar, but not preferred, protective operation.

Consequently, the FETs 130 and 132 eliminate the fuse 80 and the diode 82 from the prior art circuit to not only reduce wasted power consumption, but additionally to prevent circuit damage in the event of any misconnection and upon any disconnection of a battery.

The circuit of FIG. 3 also has a ripple filter 145 for smoothing AC ripple generated by modulation at less than 50%. However, the ripple filter 145 is interposed between the center tap of autotransformer 114 and the intermediate equalizer terminal 122 in order to increase its effectiveness. This position achieves the greatest noise reduction because it effects current in both the 24 volt leg and the 12 volt leg of the circuit and filters signals above the vehicle ground. Additionally, an RF filter 147 is interposed between the FET 130 and the 24 volt distal equalizer terminal 147 to provide isolation so that RF signals generated by the switching circuit do not interfere with any accessories or equipment which are supplied by the batteries.

Figure 4:
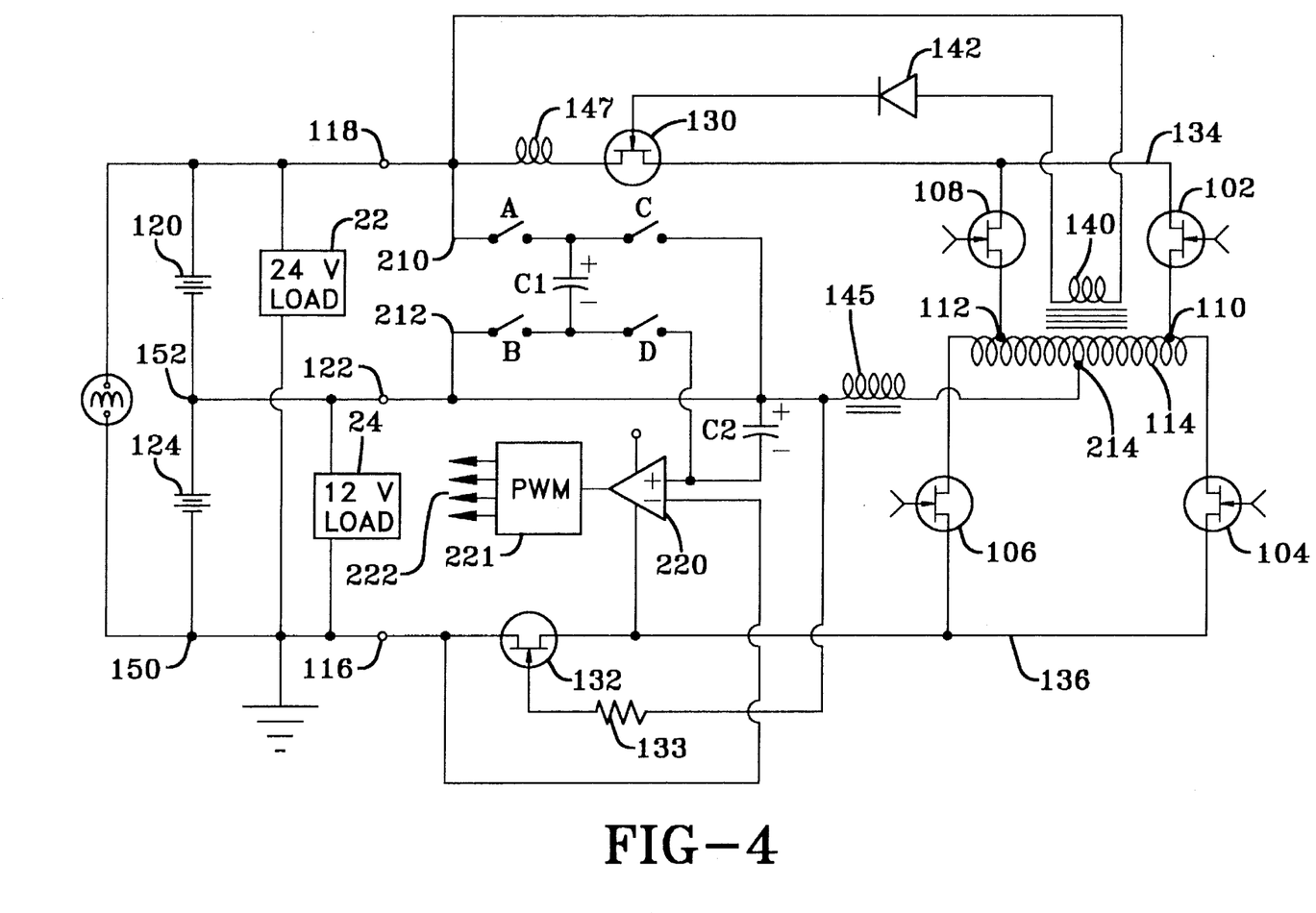
FIG. 4 is a simplified but more complete schematic diagram illustrating additional principles of the present invention.

FIG. 4 illustrates the circuit of FIG. 3 to which a switching control circuit has been added. A switching control circuit can be used which is simply a rectangular wave oscillator turning on the switches in obliquely opposite, alternating pairs, each with a 50% duty cycle. For example, transistors 102 and 106 may be turned on for the first half of a cycle while transistors 104 and 108 are off and then during the second half of the cycle, the states are reversed so that transistors 104 and 108 are on and transistors 102 and 106 are off. For unmodulated duty cycles of 50% or less, the circuit will still equalize the batteries in the manner described above, but the rate of energy transfer from one battery to the other will be reduced in proportion to the reduction of the on time duty cycle.

When the battery voltages are equalized, the maintenance of the full 50% duty cycle, or even a lower duty cycle, results in the circuit merely transferring energy back and forth between the batteries, wasting energy in the circuit, principally through core losses in the transformer. Consequently, it is desirable to reduce the duty cycle of transistor on-time as equalization is approached until the modulation is decreased to substantially zero at equilibrium. More specifically, in the preferred embodiment when, the upper battery 120 voltage is equal to or less than the lower battery 124 voltage, the modulation should be nearly 0% so no energy is transferred between the batteries and the loads will discharge the lower battery to accomplish equalization. However, when the upper battery 120 voltage is greater than the lower battery 124 voltage, the modulation should be increased in proportion to the voltage difference.

To accomplish this with the present invention, the voltages of the two series batteries are each detected. These voltages are subtracted to obtain an error signal representing the difference of the two battery voltages. The duty cycle of the pulse width modulator is then varied as an increasing function of the error signal so that the transistors in the full bridge are switched on for an interval of time, which is proportional to that error signal difference over a range of voltage differences, including zero; that is, from zero to a selected value of voltage difference at which the duty cycle is 50%. However, the voltage range over which this variation in duty cycle occurs is very small, typically one or a few millivolts because the error amplifier 220 (discussed below) has a high gain. This small difference in the battery voltages will result in the 50% duty cycle.

Obtaining this error signal requires differencing the voltage of the lower battery 124, which is referenced to a common or ground 150 and the voltage of the floating upper battery 120 which is referenced to the intermediate battery terminal 152. In the circuit of the present invention, the battery voltage 120 is translated so that it can be differenced with the voltage of the battery 124.

This voltage translation is accomplished using a voltage converter, such as a Harris ICL 7662. The voltage converter has one input 210 connected through the RF filter 147 and the protective FET 130 to the first node 134 of the H-bridge, and a second input 212 connected to the center tap 214 of the autotransformer 114 through the ripple filter indicator 145. A first pair of simultaneously operable switches A and B are each connected to a different terminal of a first capacitor C1 and a different input terminal 210 or 212 of the voltage converter. The switches A and B simultaneously connect and simultaneously disconnect the first capacitor C1 to the converter input terminals 210 and 212. Consequently, with switches A and B closed, the capacitor C1 becomes charged to a voltage equal to the voltage of upper battery 120.

A second pair of simultaneously operable switches C and D are each connected between a different terminal of the first capacitor C1 and a different terminal of a second capacitor C2. The switches C and D simultaneously connect or simultaneously disconnect the first capacitor to the second capacitor. The switch pairs A and B and the switch pairs C and D are switched in a synchronously opposite manner so that when the switches A and B are closed the switches C and D are open, and when the switches C and D are closed the switches A and B are open. In this manner, the voltage of the upper battery 120 is first captured on capacitor C1 and then transferred to capacitor C2 without the occurrence of any short circuit connection between any of the equalizer terminals 116, 118, and 122. Thus, the alternate switching of switch pairs A and B and switch pairs C and D provides both isolation and a transferring or mirroring of the voltage of the upper battery 120, which is referenced to the intermediate equalizer node 122, to a floating voltage which can be series connected to the lower battery 124 to obtain a difference voltage referenced to ground.

One side of the capacitor C2 is connected to the intermediate equalizer terminal 122 and the opposite side of the capacitor C2 is connected to one input of an error signal amplifier, such as operational amplifier 220. The error amplifier 220 has its inverting input connected to the common or ground equalizer terminal 116. Therefore, the input to the non-inverting input of amplifier 220 is the algebraic sum of the voltage of battery 124 and the voltage across capacitor C2, which equals the voltage of battery 120. Since the switches C and D are connected to capacitor C2 to make the polarity of the voltage on capacitor C2 opposite to the voltage of battery 124, the voltages input to the non-inverting input of amplifier 220 is the difference of the voltage magnitudes of the two batteries. Thus, the output of the error amplifying operational amplifier 220 provides an output voltage which is proportional to the difference between the voltages between the center tap 214 and each of the first pair of bridge nodes 134 and 136; that is, proportional to the difference between the battery voltages. The output of the error amplifier 220 is then applied to a pulse width modulator 221 which has four outputs 222 connected to the transistor control terminals, namely the gates of transistors 102–108, for switching those transistors on for time intervals proportional to the voltage difference over at least a voltage difference range extending from zero.

The pulse width modulator 221 is of conventional design which is commonly known to those skilled in the art. The error signal output from the operational amplifier 220 is compared in the pulse width modulator 221 to a precision triangle to provide the pulse width modulated, output rectangular waveform, ie the width of the output pulses is proportional to the difference between the battery voltages. In the preferred embodiment, the triangle wave has a frequency of 27 KHz although a broad range of frequencies may be used, for example from 10 to 250 KHz.

Therefore, one advantage of this structure and method is that errors in the resistance values of precision resistors, which result either in deviation of the resistors from their nominal value within their tolerance ranges or from ageing, are eliminated so that this circuit remains perpetually accurate. This circuit directly compares the two voltages which are sought to be equalized, rather than comparing one of the voltage to the average of the sum of the two voltages, as was done with the prior art.

Although bias windings were known in the prior art and are used in the preferred embodiment of the present invention, the present invention permits the use of considerably smaller bias windings. For example, the turns ratio of prior art bias windings were on the order of 7:3, while the bias windings used with the present invention are on the order of 9:1 or 10:1. The purpose of the bias windings is to offset any voltage drops in the circuit, such as from the resistance of the switching components, the protective components and the transformer windings. Thus, the bias windings compensate for these voltage drops to provide essentially perfect reflection of the battery voltages across the transformer while the transformer is under load when the voltage drops across these resistive elements become a significant factor. Consequently, the bias windings provide a slight voltage imbalance to compensate for these voltage drops.

It will be apparent to those skilled in the art that the transistors 102 and 108 in the upper two legs of the full bridge will need a gate voltage for proper control which is higher than the 24 volt supply voltage in the case of, for example, N-channel devices, such as are used in the preferred embodiment. This voltage may need to be 10 to 15 volts above the drain voltage, which is at 24 volts, in order to properly turn on the field effect transistor. Fortunately, however, circuits are commercially available, such as the International Rectifier 2110 High Side Driver which is used in the preferred embodiment of the invention.

In its broadest aspect, the invention is not limited to the use of field effect transistors because power switching bipolar transistors could be used. However, they result in a substantial increase in losses and therefore a reduction of efficiency, and additionally cause a loss of the bidirectionality of the circuit. However, such a circuit would be workable because there is not always a need to transfer power from the grounded lower battery 124 to the upper battery 120. The reason is that the 12 volt loads are typically connected in shunt with the lower battery so, if the lower battery voltage exceeds the upper battery voltage, the lower battery can simply be drained until it equalizes. Furthermore, other devices, such as triacs may be used for switching, but would not be as efficient.

Figure 6:
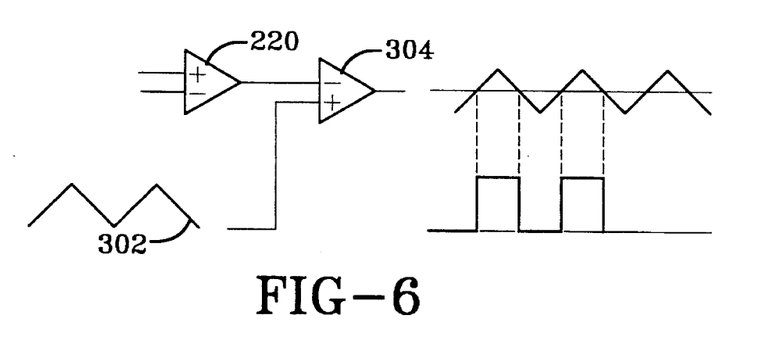
FIGS. 6 and 7 are schematic diagrams of a portion of a circuit embodying the invention and illustrate a circuit enhancement.

It should be noted that the bidirectional characteristic of the circuit can be obtained only when the switching duty cycle is not reduced to zero when the battery voltages are equalized. For example, using the oscillator described above maintains full bidirectionality while using the modulation arrangement of the preferred embodiment loses bidirectionality. However, the preferred modulation loses bidirectionality only because the transistor switches of the full bridge are held off when the upper battery 120 voltage is equal to or less than the lower battery 124 voltage. Maintenance of some minimum on time will retain bidirectionality but will result in some wasted energy. A further enhancement of the circuit is illustrated in connection with FIGS. 6 and 7. FIG. 6 illustrates a portion of the conventional pulse width modulator in which a triangle wave signal 302 is applied to one input of a comparator 304 and the output of the error amplifier 220 is applied to the other input of the comparator 204. Consequently, the output of the comparator 204 is at a high level when the instantaneous amplitude of the triangle wave exceeds the instantaneous value of the error voltage and is at a low level when the instantaneous amplitude of the triangle wave is less than the value of the error voltage.

Figure 7:
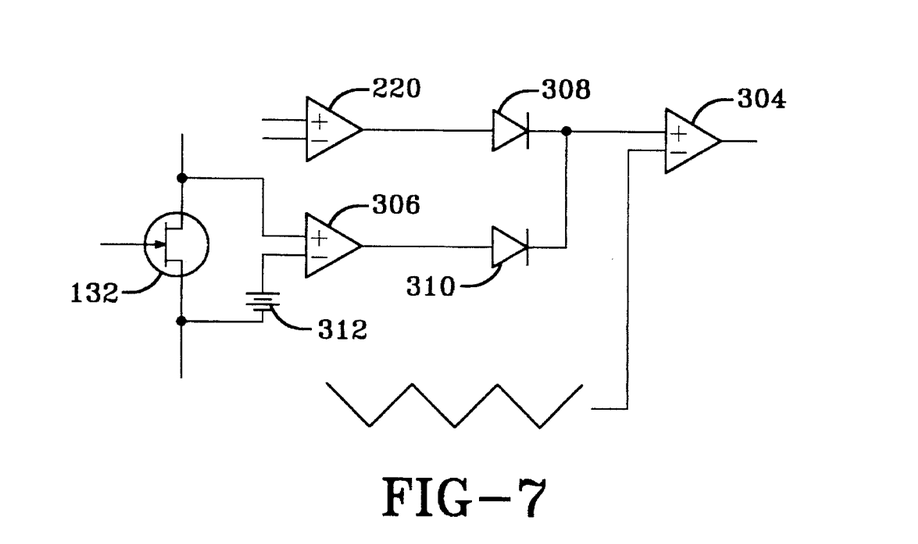

FIG. 7 illustrates a modification of the above circuit to provide additional protection for the circuit of the present invention. In this circuit a comparator 306 has its input connected to the voltage across the FET 132. The outputs of both the error amplifier 220 and the comparator 306 are connected through a conventional OR circuit, comprising diodes 308 and 310, to the input of the comparator 304. A reference voltage is applied to one input of the comparator 306 and the voltage developed across the field effect transistor 132 is applied to the other input. This circuit provides over current protection. As current through FET 132 increases, the voltage across it increases and is applied to one input of the comparator 306. That voltage is compared to the reference voltage 312 and the reference voltage 312 is selected so that when the current through FET 132 becomes excessive, the output of comparator 306 will switch and thus cause the modulation from the modulator to go to 0% modulation, thus turning off the circuit to protect it. The FET transistor 132 provides a cumulative protective effect in the event of a high current. Under a high current, the voltage across the battery 124, which supplies that current, will decrease. Because the lower battery 124 provides the bias for switching the transistor 132 on, a sufficient decrease in that battery voltage will increase the drain to source resistance of the FET 132 which will increase the drain to source voltage across FET 132. Consequently, there is a bootstrap effect with both the current increase through FET 132 and the increase in its resistance contributing to an increase in voltage across it. It is this voltage which is compared to the reference voltage 312 and therefore these two effects accelerate the shut off of the circuit in the event of excessive current.

A further advantage arises because the drain to source resistance of the FET transistors is an increasing function of transistor temperature so as temperature increases, the $R_{DS}$ on increases. Consequently, increased temperature also increases the drain to source voltage giving the result that the circuit is responsive to temperature. Temperature increases therefore reduce the current limit at which the voltage across the FET 132 exceeds the reference voltage 312.

Figure 5A:
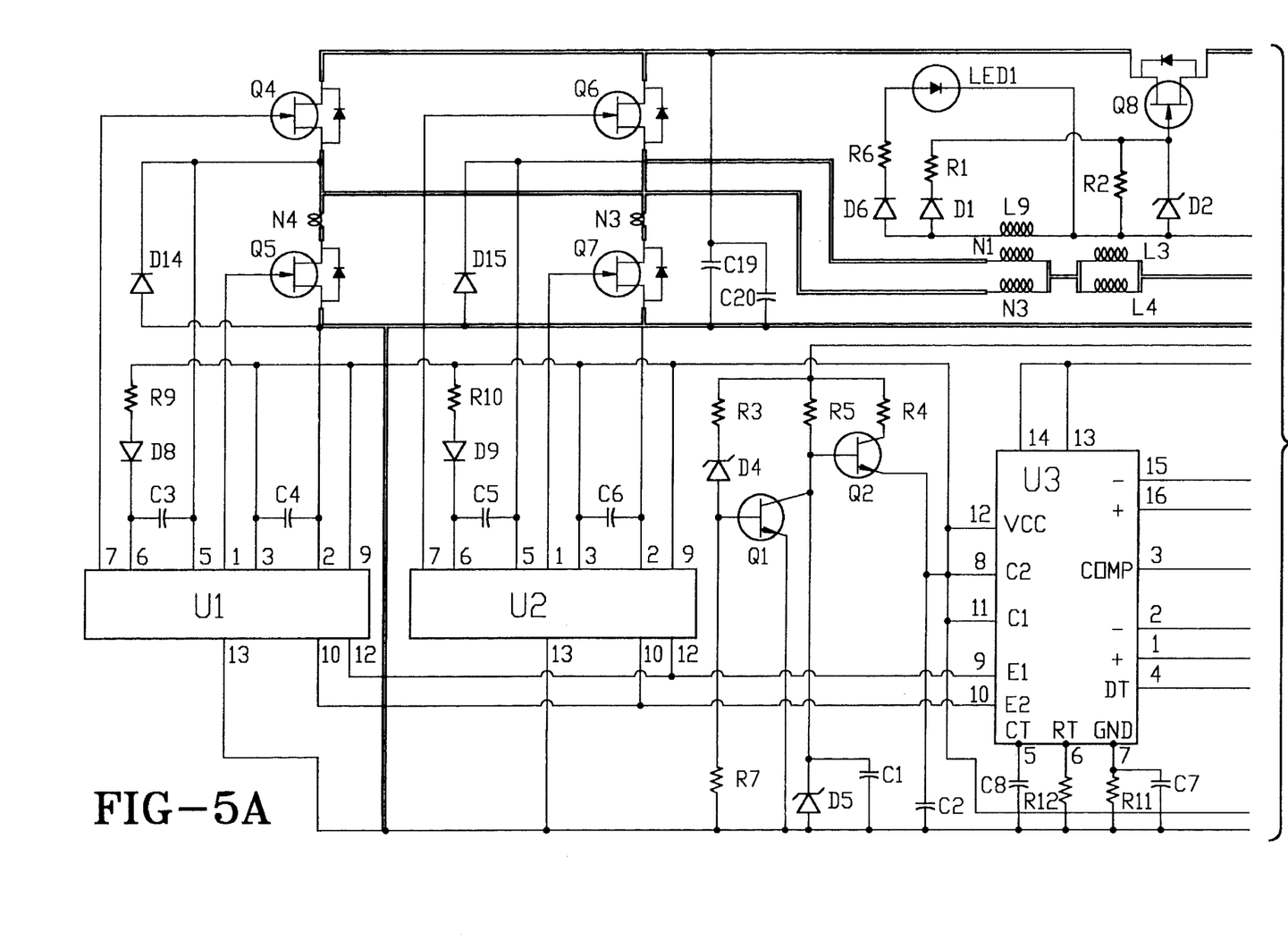
FIG. 5 is a schematic diagram of the preferred embodiment of the invention.
Figure 5B:
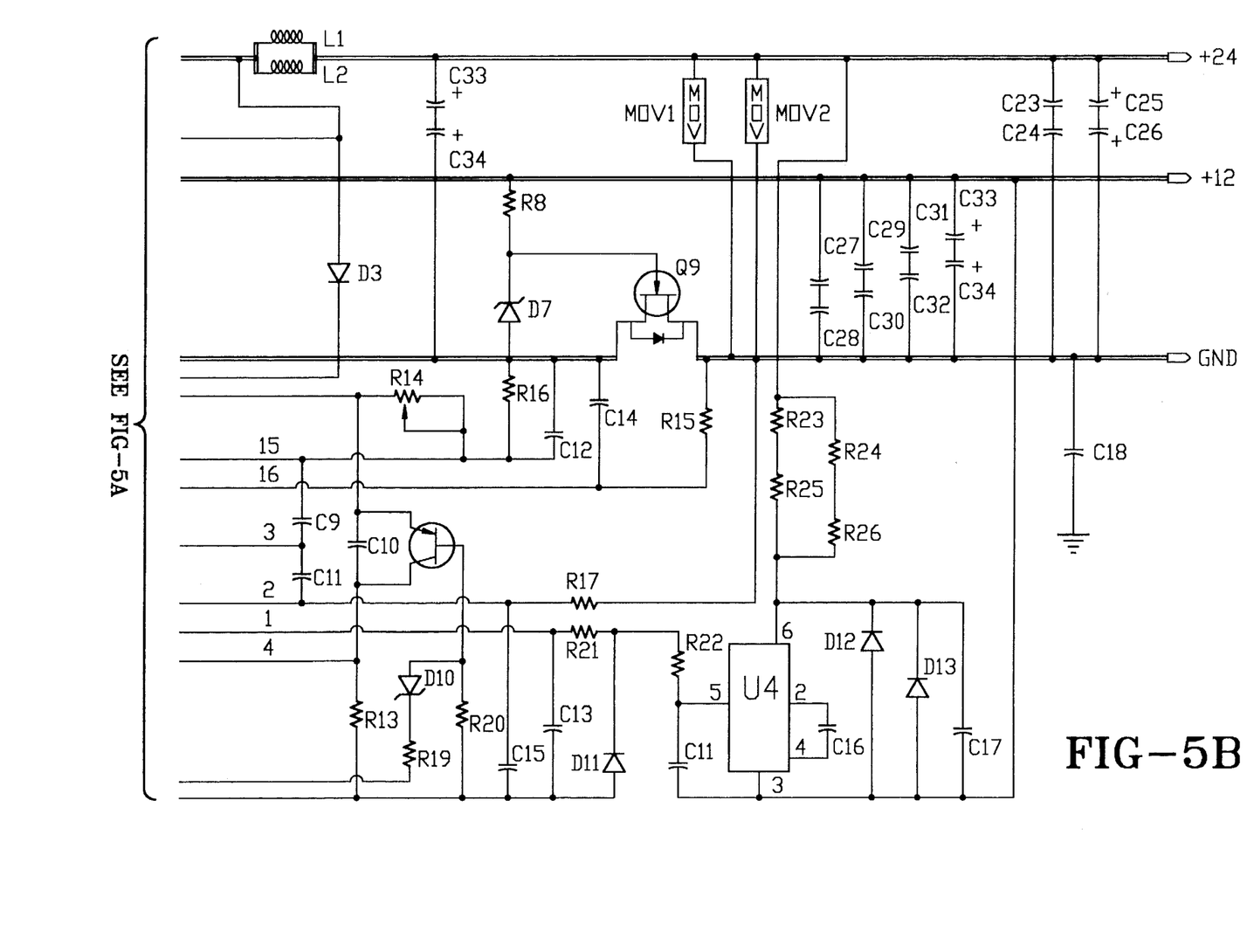

FIG. 5 is a full schematic diagram of the preferred embodiment of the invention. In order to obtain equalizer having a higher current rating, individual circuit elements with a higher current rating may be utilized. Alternatively, additional circuit elements can be added in parallel to increase the current handling capability or multiple entire equalizer units may be connected in parallel.

The present invention has been found to provide the substantial advantages described above. For example, in a normal DC to DC converter an efficiency of 80–85% is considered reasonable. The above described prior art circuit accomplished an efficiency of 91%. With the present invention, however, laboratory testing has resulted in a measured efficiency of 98.2%. This equates to the availability of an additional 7 amps for use by 12 volt loads in a typical 100 amp equalizer unit. Regulation to within 1% is easily obtainable with embodiments of the present invention.

While certain preferred embodiments of the present invention have been disclosed in detail, it is to be understood that various modifications may be adopted without departing from the spirit of the invention or scope of the following claims.

We claim:

1. A battery equalizer for equalizing the voltage of series connected batteries, the equalizer having a pair of distally opposite equalizer terminals for connection to the distally opposite battery terminals of the series batteries and an intermediate equalizer terminal for connection to an intermediate battery terminal of the series batteries, the equalizer comprising:

(a) a full bridge having a first pair of opposite bridge nodes connected to the distally opposite equalizer terminals and having four legs defining a second pair of opposite, intermediate bridge nodes, each leg including an interposed power switching transistor connected for switching current through its leg, each transistor also having a switching control terminal;

(b) an autotransformer having opposite end terminals connected between said second pair of nodes and having a tap connected to said intermediate equalizer terminal; and (c) a switching control circuit having outputs connected to the control terminal of each switching transistor and adapted to synchronously and alternatingly turn on the switching transistors of opposite legs of the bridge to connect said opposite end terminals of the autotransformer to said distally opposite equalizer terminals in alternating polarities.

2. A battery equalizer in accordance with claim 1 wherein the switching transistors are power field effect transistors.

3. A battery equalizer in accordance with claim 2 wherein the control circuit includes an oscillator for turning the transistors on for substantially 50% duty cycles.

4. A battery equalizer in accordance with claim 2 wherein said tap is a center tap and there are two of said batteries and the control circuit further comprises:

(a) a voltage converter having an input connected to a first node of said first pair of nodes and an input connected to said center tap for inputting a voltage representing the voltage of a battery, the voltage converter having a pair of outputs which are isolated from the voltage converter inputs and provide an output which is proportional to the voltage between said first bridge node and said center tap, said output terminals being series connected with said center tap and second node of said first pair of bridge nodes for algebraically summing the voltage converter output voltage with the voltage between the center tap and the second node of the first bridge nodes to provide a difference voltage representing the difference between the voltages of said batteries; and (b) a pulse width modulator having its input connected to receive the voltage proportional to said difference voltage and having its output connected to said transistor control terminals for switching the transistors on for time intervals which are an increasing function of said voltage difference.

5. A battery equalizer in accordance with claim 4 wherein bias windings are connected at each of said second pair of opposite, intermediate bridge nodes.

6. A battery equalizer in accordance with claim 5 wherein a ripple filter inductor is interposed between the tap and the intermediate equalizer terminal.

7. A battery equalizer in accordance with claim 4 wherein a first distal equalizer terminal is designated for connection to the positive distal battery terminal and the second distal equalizer terminal is designated for connection to the negative distal battery terminal, and wherein the equalizer further comprises:

(a) a first protective, switching device interposed for switching between the first distal equalizer terminal and the first node of said first pair of bridge nodes;

(b) a diode connected parallel to the switching device for permitting current flow when the equalizer is properly connected to the batteries; and (c) a secondary winding on said transformer connected to said first protective switching device for turning on the first protective switching device.

8. A battery equalizer in accordance with claim 7 wherein the switching device is a power switching field effect transistor, the diode is the inherent, drain-source diode of the field effect transistor and the field effect transistor has a gate connected through a diode to the secondary winding.

9. A battery equalizer in accordance with claim 8 and further comprising: a protective, power switching, field effect transistor interposed between the second distal equalizer terminal and the second node of the first pair of bridge nodes and having its gate connected to the first node.

10. A battery equalizer in accordance with claim 9 wherein the voltage converter comprises:

(a) a first capacitor;

(b) a second capacitor connected across the output terminals of the voltage converter;

(c) a first pair of simultaneously operable switches each connected between a different terminal of the first capacitor and a different input of the voltage converter for simultaneously connecting and disconnecting the first capacitor to the converter input;

(d) a second pair of simultaneously operable switches each connected between a different terminal of the first capacitor and a different terminal of the second capacitor for simultaneously connecting the first capacitor to the second capacitor when the first capacitor is not connected to the converter input and for disconnecting the first capacitor from the second capacitor when the first capacitor is connected to the converter input.

11. A battery equalizer in accordance with claim 4 wherein the voltage converter comprises:

(a) a first capacitor;

(b) a second capacitor connected across the output terminals of the voltage converter;

(c) a first pair of simultaneously operable switches each connected between a different terminal of the first capacitor and a different input of the voltage converter for simultaneously connecting and disconnecting the first capacitor to the converter input;

(d) a second pair of simultaneously operable switches each connected between a different terminal of the first capacitor and a different terminal of the second capacitor for simultaneously connecting the first capacitor to the second capacitor when the first capacitor is not connected to the converter input and for disconnecting the first capacitor from the second capacitor when the first capacitor is connected to the converter input.

12. A battery equalizer in accordance with claim 4 wherein a first distal equalizer terminal is designated for connection to the positive distal battery terminal and the second distal equalizer terminal is designated for connection to the negative distal battery terminal, and wherein the equalizer further comprises:

(a) a first protective, switching device interposed for switching between the first distal equalizer terminal and the first node of said first pair of bridge nodes;

(b) a diode connected parallel to the switching device for permitting current flow when the equalizer is properly connected to the batteries; and (c) a secondary winding on said transformer connected to said first protective switching device for turning on the first protective switching device.

13. A battery equalizer in accordance with claim 12 wherein the switching device is a power switching field effect transistor, the diode is the inherent, drain-source diode of the field effect transistor and the field effect transistor has a gate connected through a diode to the secondary winding.

14. A battery equalizer in accordance with claim 1 wherein a first distal equalizer terminal is designated for connection to the positive distal battery terminal and the second distal equalizer terminal is designated for connection to the negative distal battery terminal, and wherein the equalizer further comprises a protective, power switching, field effect transistor interposed in the connection between the negative distal equalizer terminal and a node of the first pair of bridge nodes and having its gate connected to the other node of said first pair of nodes for switching on the protective transistor.

15. A battery equalizer in accordance with claim 1 wherein said tap is a center tap and there are two of said batteries and the control circuit further comprises:

(a) a voltage converter having an input connected to a first node of said first pair of nodes and an input connected to said center tap for inputting a voltage representing the voltage of a battery, the voltage converter having a pair of outputs which are isolated from the voltage converter inputs and provide an output which is proportional to the voltage between said first bridge node and said center tap, said output terminals being series connected with said center tap and second node of said first pair of bridge nodes for algebraically summing the voltage converter output voltage with the voltage between the center tap and the second node of the first bridge nodes to provide a difference voltage representing the difference between the voltages of said batteries; and (b) a pulse width modulator having its input connected to receive the voltage proportional to said difference voltage and having its output connected to said transistor control terminals for switching the transistors on for time intervals which are an increasing function of said voltage difference.

16. A battery equalizer in accordance with claim 1 wherein bias windings are connected at each of said second pair of opposite, intermediate bridge nodes.

17. A battery equalizer in accordance with claim 1 wherein a ripple filter inductor is interposed between the tap and the intermediate equalizer terminal.

18. A method for equalizing the voltages of storage batteries connected in series to have distally opposite battery terminals and at least one intermediate battery terminal, the method comprising:

synchronously switching the opposite ends of a tapped autotransformer in alternately reversing connection to the distally opposite terminals of the batteries by alternately turning transistor switches on and off in alternate pairs while maintaining a tap of the autotransformer connected to an intermediate terminal of the series batteries.

19. A method in accordance with claim 18 wherein the method further comprises:

(a) detecting the voltages on two of said series batteries;

(b) subtracting one voltage from the other to obtain a signal representing the difference of the voltages; and (c) switching said transistors on for an interval of time which is proportional to said difference over a range of voltage differences including substantially zero.

20. A method in accordance with claim 19 wherein the detecting step further comprises converting the voltage between the tap and one of the distally opposite battery terminals to a signal level which is differenced with a signal level corresponding to the voltage between the tap and other distally opposite battery terminal.

\* \* \* \* \*